(12) United States Patent
Jung et al.

(10) Patent No.: US 11,708,080 B2
(45) Date of Patent: Jul. 25, 2023

(54) METHOD AND DEVICE FOR CONTROLLING AUTONOMOUS DRIVING

(71) Applicants: HYUNDAI MOTOR COMPANY, Seoul (KR); KIA MOTORS CORPORATION, Seoul (KR)

(72) Inventors: Chan Hee Jung, Seoul (KR); Jin Su Jeong, Suwon-si (KR); Jae Yong Jeon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 129 days.

(21) Appl. No.: 16/950,088

(22) Filed: Nov. 17, 2020

(65) Prior Publication Data

US 2021/0403013 A1 Dec. 30, 2021

(30) Foreign Application Priority Data

Jun. 30, 2020 (KR) .................. 10-2020-0080429

(51) Int. Cl.
*B60W 50/029* (2012.01)
*B60W 60/00* (2020.01)
*B60W 10/04* (2006.01)

(52) U.S. Cl.
CPC .......... *B60W 50/029* (2013.01); *B60W 10/04* (2013.01); *B60W 60/0059* (2020.02);
(Continued)

(58) Field of Classification Search
CPC .............. B60W 50/029; B60W 10/04; B60W 60/0059; B60W 2050/0297; B60W 2540/043; B60W 2720/106; B60W 60/00186; B60W 2050/0025; B60W 2050/0215; B60W 2050/022; B60W 60/0015; B60W 50/0205; B60W 60/007; B60K 28/06; B60K 28/10; G05D 1/0055
(Continued)

(56) References Cited

U.S. PATENT DOCUMENTS

2006/0015231 A1* 1/2006 Yoshimura ............ B60L 3/0076
701/1
2017/0297565 A1* 10/2017 Joyce ................... G05D 1/0088
(Continued)

OTHER PUBLICATIONS

The extended European search report dated May 4, 2021 for the corresponding European Patent Application No. 20206394 (9 pgs.).

*Primary Examiner* — Jonathan M Dager
*Assistant Examiner* — Jean W Charleston
(74) *Attorney, Agent, or Firm* — Lempia Summerfield Katz LLC

(57) ABSTRACT

A method for controlling autonomous driving in a vehicle capable of the autonomous driving may include collecting vehicle travel status information and system status information during the autonomous driving, sensing a failure based on the system status information, identifying normally controllable actuators when sensing the failure, determining a risk degree corresponding to the sensed failure based on the normally controllable actuator information and the vehicle travel status information, determining a safety state based on normally controllable actuator information and the risk degree, and determining a failure safety strategy corresponding to the safety state.

20 Claims, 10 Drawing Sheets

(52) U.S. Cl.
CPC ............... *B60W 2050/0297* (2013.01); *B60W 2540/043* (2020.02); *B60W 2720/106* (2013.01)

(58) Field of Classification Search
USPC .......................................................... 701/29
See application file for complete search history.

(56) References Cited

U.S. PATENT DOCUMENTS

| | | | |
|---|---|---|---|
| 2018/0046182 A1* | 2/2018 | Joyce | G01C 21/3453 |
| 2019/0315346 A1* | 10/2019 | Yoo | B60W 50/12 |
| 2019/0315360 A1* | 10/2019 | Kim | B60W 50/0098 |
| 2020/0086885 A1* | 3/2020 | Hiraga | B60W 50/023 |
| 2020/0139982 A1* | 5/2020 | Sakamoto | B60W 50/0205 |
| 2020/0201323 A1* | 6/2020 | Park | B60W 50/04 |
| 2020/0209848 A1* | 7/2020 | Mercep | G01S 13/931 |

* cited by examiner

| AUTOMATION LEVEL | SAE CLASSIFICATION CRITERIA | SYSTEM ROLE | DRIVER ROLE |
|---|---|---|---|
| LEVEL 0 | NO AUTOMATION | PERFORM TEMPORARY EMERGENCY INTERVENTION OR PROVIDE WARNINGS ONLY | DRIVER PERFORMS ALL DRIVING |
| LEVEL 1 | DRIVER ASSISTANCE | PERFORM SOME TRAVEL FUNCTIONS SUCH AS STEERING, ACCELERATION/DECELERATION, AND THE LIKE TOGETHER UNDER BOARDING OF DRIVER WHO PERFORMS TRAVEL FUNCTION IN NORMAL OPERATION SECTION | DRIVER DETERMINES WHETHER/WHEN TO OPERATE LEVEL 1 SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/LEVEL 1 SYSTEM MONITORING AND IMMEDIATE EMERGENCY PREPARATION) |
| LEVEL 2 | PARTIAL AUTOMATION | PERFORM TRAVEL FUNCTION SUCH AS STEERING, ACCELERATION/DECELERATION, AND THE LIKE INSTEAD OF DRIVER WHO IS MONITORING STEERING AND ACCELERATION/DECELERATION DEVICES UNDER BOARDING OF DRIVER | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/LEVEL 2 SYSTEM MONITORING AND IMMEDIATE EMERGENCY PREPARATION) |
| LEVEL 3 | CONDITIONAL AUTOMATION | TRANSFER RIGHT TO CONTROL TRAVEL TO DRIVER IN SITUATION OUTSIDE CONDITION AND PERFORM TRAVEL FUNCTION SUCH AS STEERING, ACCELERATION/DECELERATION, AND THE LIKE | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL (DRIVER IS ABLE TO PREPARE EMERGENCY BY NECESSARILY RECEIVING RIGHT TO CONTROL WHEN LEVEL 3 SYSTEM REQUESTS CONTROL TO RIGHT TRANSFER) |
| LEVEL 4 | HIGH AUTOMATION | SYSTEM PERFORMS ALL TRAVEL FUNCTIONS UNDER BOARDING OF DRIVER FOR EXTREMELY EXCEPTIONAL SITUATION | DRIVER MAY SELECTIVELY PREPARE EMERGENCY WHEN LEVEL 4 SYSTEM REQUESTS RIGHT TO CONTROL TRANSFER |
| LEVEL 5 | FULL AUTOMATION | PERFORM COMPLETE TRAVEL FUNCTION CAPABLE OF RESPONDING TO ALL SITUATIONS WITHOUT DRIVER | DRIVER ONLY DETERMINES WHETHER TO OPERATE SYSTEM BUT DOESN'T PERFORM ALL DRIVING |

FIG. 1

METHOD AND DEVICE FOR CONTROLLING AUTONOMOUS DRIVING

CROSS-REFERENCE TO RELATED APPLICATION

The present application claims priority to and the benefit of Korean Patent Application No. 10-2020-0080429, filed on Jun. 30, 2020, the entire contents of which are incorporated herein by reference.

FIELD

The present disclosure relates to autonomous vehicle control.

BACKGROUND

The statements in this section merely provide background information related to the present disclosure and may not constitute prior art.

An ability to adaptively deal with a surrounding situation changing in real time during travel is required to an autonomous vehicle.

A reliable determination control function is desired for mass production and activation of the autonomous vehicle.

It is necessary for a driver to keep eyes forward in autonomous driving systems of a level 2 that are currently in mass production. Thus, when the driver does not grip a steering wheel, a predetermined hand-off warning is output and whether the driver has intervened with steering is determined based on a change in a steering torque value based on steering wheel manipulation of the driver.

The current autonomous driving system of the level 2 immediately deactivates an autonomous driving mode when a system failure situation occurs. An autonomous driving system of a level 3 outputs a warning (transition demand, TD) requesting right to control transfer from the system to the driver when the system failure situation occurs, and then switches to be in a minimum risk manoeuvre (MRM) mode and induces safe stopping.

That is, the conventional autonomous driving system of the level 3 always responds with the same strategy regardless of a type of the system failure and a vehicle travel environment.

SUMMARY

The present disclosure provides a device and a method for controlling autonomous driving.

One form of the present disclosure provides a method and a device for controlling autonomous driving capable of dynamically providing a failure safety strategy based on sensed failure type and travel situation around a vehicle during the autonomous driving.

Another form of the present disclosure provides a method and a device for controlling autonomous driving that enable safe stop induction and safe right to control transfer to a driver by differentiating a failure safety strategy based on a failure type and a risk degree when a system failure is sensed during the autonomous driving.

According to one form of the present disclosure, a method for controlling autonomous driving in a vehicle capable of the autonomous driving includes collecting vehicle travel status information and system status information during the autonomous driving, sensing a failure based on the system status information, identifying normally controllable actuators when sensing the failure, determining a risk degree corresponding to the sensed failure based on normally controllable actuator information and the vehicle travel status information, determining a safety state based on the normally controllable actuator information and the risk degree, and determining a failure safety strategy corresponding to the safety state.

In some implementations, the determining of the risk degree may include identifying a failure type and the number of failures based on the normally controllable actuator information, determining an initial risk degree based on the failure type, determining a first weight value based on the number of failures, determining a second weight value based on the vehicle travel status information, and determining a final risk degree by applying the first weight value or the second weight value to the initial risk degree.

In some implementations, the determining of the failure safety strategy corresponding to the safety state may include determining an actuator to be used corresponding to the determined safety state among the identified normally controllable actuators, determining a maximum allowable time corresponding to the determined safety state based on the actuator determined to be used and the final risk degree, and determining an optimal failure safety scenario through the actuator determined to be used in the determined safety state.

In some implementations, the maximum allowable time may be determined in inverse proportion to the final risk degree.

In some implementations, the vehicle travel status information may include at least one of positioning signal information, vehicle exterior information, vehicle interior information, or precise map information, the vehicle exterior information may include at least one of radar sensing information, lidar sensing information, or external camera capture information, and the vehicle interior information may include at least one of indoor camera capture information or driver bio-sensing information.

In some implementations, the method may further include determining a driver status based on the vehicle interior information, and the risk degree may be determined based on the driver status determination.

In some implementations, the system status information may include at least one of braking system information, stability control system information, steering system information, shift system information, driving system information, camera system information, tire pressure measurement system information, fuel tank sensing system information, battery management system information, rain sensing system information, system information of a sensor for sensing a region ahead of the vehicle, or autonomous driving controller status information.

In some implementations, the actuator may include at least one of an electric parking brake (EPB), an electronic stability control (ESC), a motor driven power steering (MDPS), a transmission control unit (TCU), or an engine management system (EMS).

In some implementations, as the risk degree is higher, the failure safety strategy for performing deceleration control with a large deceleration amount may be determined.

In some implementations, the failure type may include at least one of a driver status and intention determining sensor failure, a failure of a rain sensor for weather determination, an autonomous driving controller failure, a global positioning system (GPS) receiver failure, a tire air pressure rapid decrease failure, a failure of a sensor for sensing a region ahead of the vehicle, a steering-related actuator failure, a braking-related actuator failure, a driving-related actuator failure, a shift-related actuator failure, or a stability control-related actuator failure.

According to another form of the present disclosure, a device for controlling autonomous driving for an autonomous vehicle includes a status information collector configured to collect vehicle travel status information and system status information during the autonomous driving, a system failure determining device configured to sense a failure based on the system status information, an actuator status identifying device configured to identify normally controllable actuators when sensing the failure, a risk degree calculator configured to determine a risk degree corresponding to the sensed failure based on the normally controllable actuator information and the vehicle travel status information, and a failure safety strategy determining device configured to determine a safety state based on the normally controllable actuator information and the risk degree and determining a failure safety strategy corresponding to the safety state.

In some implementations, the risk degree calculator may include a failure type and number identifying device configured to identify a failure type and the number of failures based on the normally controllable actuator information, an initial risk degree determining device configured to determine an initial risk degree based on the failure type, a first weight value determining device configured to determine a first weight value based on the number of failures, a second weight value determining device configured to a second weight value based on the vehicle travel status information, and a final risk degree determining device configured to determine a final risk degree by applying the first to the second weight values to the initial risk degree.

In some implementations, the failure safety strategy determining device may include an actuator determining device configured to determine an actuator to be used corresponding to the determined safety state among the identified normally controllable actuators, a maximum allowable time determining device configured to determine a maximum allowable time corresponding to the determined safety state based on the actuator determined to be used and the final risk degree, and a scenario determining device configured to determine an optimal failure safety scenario through the actuator determined to be used in the determined safety state.

In some implementations, the maximum allowable time may be determined in inverse proportion to the final risk degree.

In some implementations, the vehicle travel status information may include at least one of positioning signal information, vehicle exterior information, vehicle interior information, or precise map information, the vehicle exterior information may include at least one of radar sensing information, lidar sensing information, or external camera capture information, and wherein the vehicle interior information may include at least one of indoor camera capture information or driver bio-sensing information.

In some implementations, the device may further include a driver status determining device configured to determine a driver status based on the vehicle interior information, and the risk degree calculator may determine the risk degree based on the driver status determination.

In some implementations, the system status information may include at least one of braking system information, stability control system information, steering system information, shift system information, driving system information, camera system information, tire pressure measurement system information, fuel tank sensing system information, battery management system information, rain sensing system information, system information of a sensor for sensing a region ahead of the vehicle, or autonomous driving controller status information.

In some implementations, the actuator may include at least one of an electric parking brake (EPB), an electronic stability control (ESC), a motor driven power steering (MDPS), a transmission control unit (TCU), or an engine management system (EMS).

In some implementations, as the risk degree is higher, the failure safety strategy determining device may determine the failure safety strategy for performing deceleration control with a large deceleration amount.

In some implementations, the failure type may include at least one of a driver status and intention determining sensor failure, a failure of a rain sensor for weather determination, an autonomous driving controller failure, a global positioning system (GPS) receiver failure, a tire air pressure rapid decrease failure, a failure of a sensor for sensing a region ahead of the vehicle, a steering-related actuator failure, a braking-related actuator failure, a driving-related actuator failure, a shift-related actuator failure, or a stability control-related actuator failure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

The above and other objects, features and advantages of the present disclosure will be more apparent from the following detailed description taken in conjunction with the accompanying drawings:

FIG. 1 is a table in which automation levels of an autonomous vehicle are defined;

Figure 2:
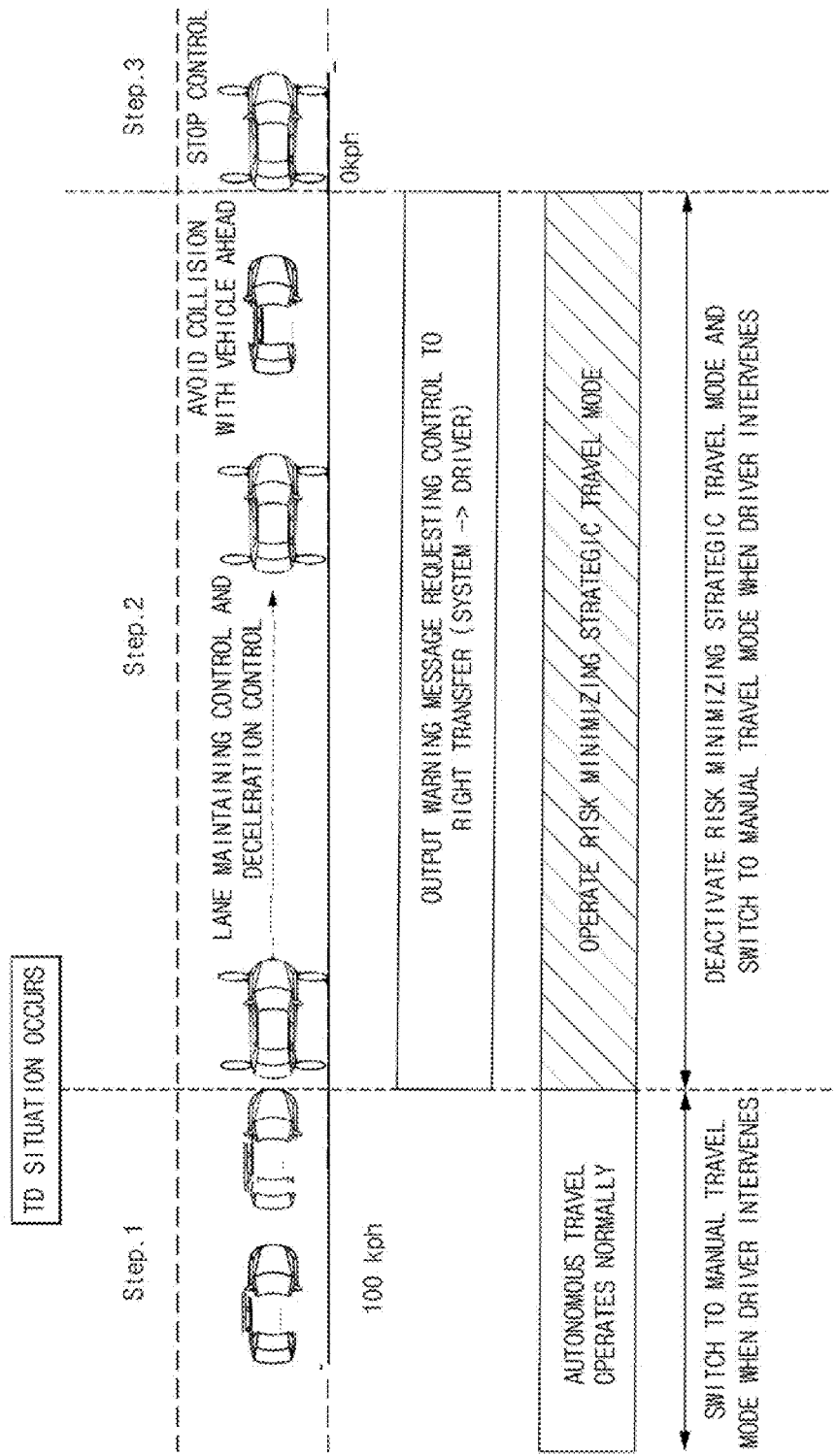
FIG. 2 is a view for illustrating a vehicle control procedure based on TD generation during autonomous driving.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, various forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing various forms of the present disclosure, a detailed description of the related known configuration or function will be omitted when it is determined that it interferes with the understanding of the present disclosure.

In describing the components of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, various forms of the present disclosure will be described in detail with reference to FIGS. 1 to 10.

FIG. 1 is a table in which automation levels of an autonomous vehicle are defined.

An autonomous vehicle means a vehicle that travels by itself by recognizing a travel environment by itself to determine a risk and control a travel path while reducing travel manipulation of a driver.

Ultimately, the autonomous vehicle means a vehicle that may be traveled, manipulated, and parked without human influence, which focuses on a vehicle in a state in which an autonomous driving technology. That is, an ability to drive the vehicle without active control or monitoring of the driver, which is a core foundation of the autonomous vehicle, has been developed to the highest level.

However, a concept of a current autonomous vehicle may include an intermediate level of automation, as shown in FIG. 1, which is going to a fully autonomous vehicle, and correspond to a goal-oriented concept that presupposes mass production and commercialization of the fully autonomous vehicle.

An autonomous driving control method according to the present disclosure may be applied to an autonomous vehicle corresponding to a level 3 (conditional autonomous driving) among the automation levels of the autonomous driving shown in FIG. 1. However, the method may not be necessarily limited thereto, and may be applied to all levels of autonomous vehicles that require right to control transfer and vehicle control based on a system failure during the autonomous driving.

The automation levels of the autonomous vehicle based on the Society of Automotive Engineers (SAE) in America may be classified as shown in the table in FIG. 1 above.

FIG. 2 is a view for illustrating an autonomous vehicle control procedure based on TD generation during autonomous driving.

Hereinafter, for convenience of description, the autonomous vehicle will be simply described as a "vehicle".

Referring to FIG. 2, when an autonomous driving function is activated in response to an autonomous driving selection button input of the driver, the vehicle may perform autonomous driving control.

The vehicle may determine whether the driver has intervened in consideration of a steering wheel torque value, a steering wheel torque maintaining time, and the like in an autonomous driving normal operating state.

When the driver intervention is sensed in the autonomous driving normal operating state, the vehicle may activate a manual travel mode.

When a transition demand (TD) situation occurs due to the system failure, collision risk sensing, and the like during the autonomous driving, the vehicle may activate a risk minimizing strategic travel mode after outputting a warning message of requesting the right to control transfer from a system to the driver.

In this connection, the TD situation means a situation in which the autonomous driving is no longer to be able to be maintained, which may include situations such as interruption of another vehicle, appearance of a pedestrian or a wild animal at a location ahead of the vehicle, sensing of an obstacle ahead of the vehicle, sudden stop of a vehicle ahead of the vehicle, a bad weather, and the like, but may not be limited thereto. The TD situation may include a situation of system disaster and failure such as a vehicle controller failure, a vehicle communication failure, a fuel shortage, and the like.

When activating the risk minimizing strategic travel mode, the vehicle may perform lane maintaining deceleration control until the vehicle is completely stopped.

The vehicle may determine whether the driver has intervened in the risk minimizing strategic travel mode in consideration of a driver's gaze direction, the steering wheel torque value, the steering wheel torque maintaining time, the right to control transfer button input, and the like.

When sensing the driver intervention in the risk minimizing strategic travel mode, the vehicle may deactivate the risk minimizing strategic travel mode and activate the manual travel mode.

When the right to control transfer is normally completed in response to the driver intervention in the risk minimizing strategic travel mode, the vehicle may stop outputting the warning message requesting the right to control transfer from the system to the driver.

Figure 3:
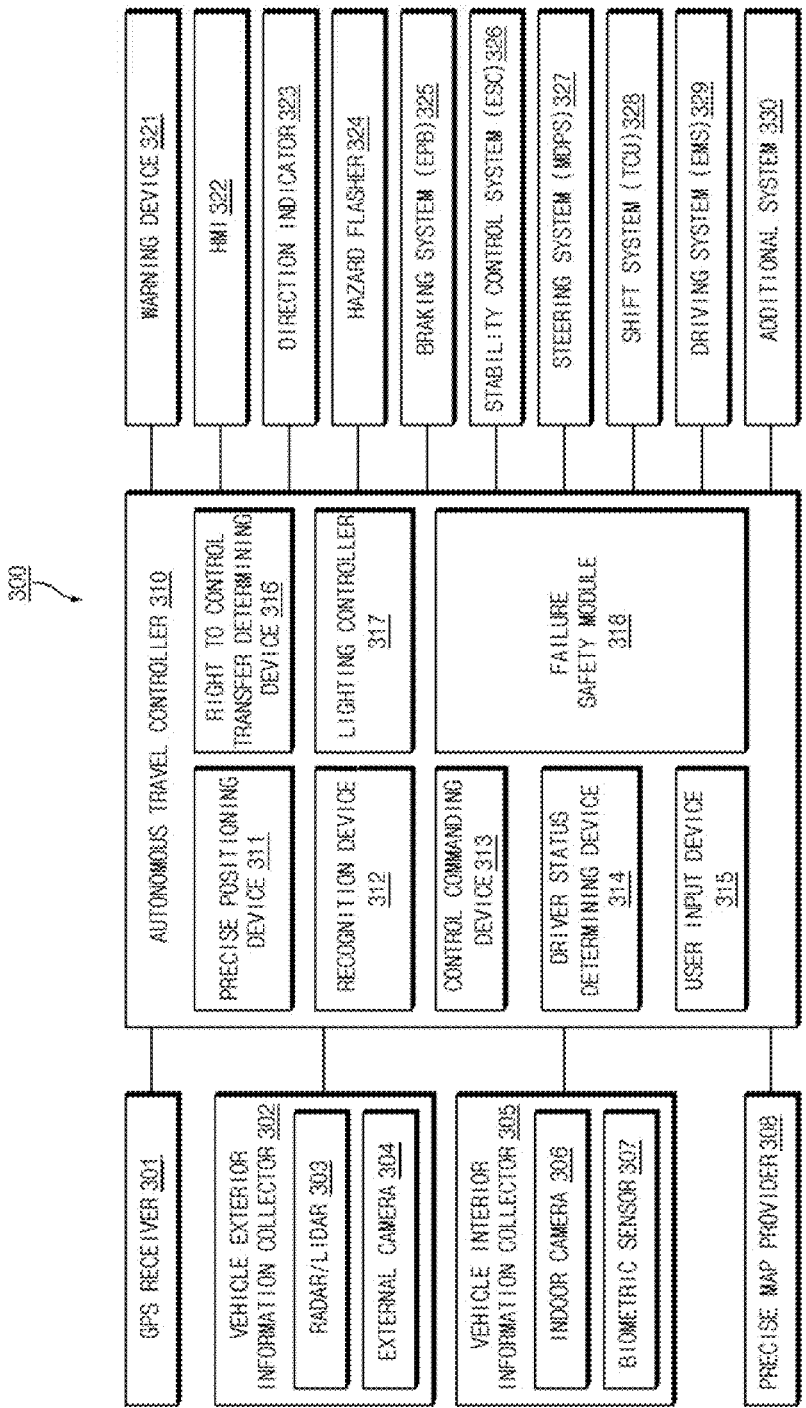
FIG. 3 is a block diagram for illustrating a structure of an autonomous driving control device according to one form of the present disclosure.

FIG. 3 is a block diagram for illustrating a structure of an autonomous driving control device according to one form of the present disclosure.

The autonomous driving control device according to FIG. 3 may be mounted on an autonomous vehicle of a level equal to or higher than the level 3.

For convenience of description below, an autonomous driving control device 300 will be described by being simply referred to as the device 300.

Referring to FIG. 3, the device 300 may include a global positioning system (GPS) receiver 301, a vehicle exterior information collector 302, a vehicle interior information collector 305, a precise map provider 308, an autonomous driving controller 310, a warning device 321, a human machine interface (HMI) 322, a direction indicator 323, a hazard flasher 324, a braking system 325, a stability control system 326, a steering system 327, a shift system 328, a driving system 329, and an additional system 330.

Each system associated with the autonomous driving controller 310 may be equipped with each controller to monitor whether the system has failed and transmit a monitoring result to a failure safety module 318 of the autonomous driving controller 310.

The GPS receiver 301 may receive a positioning signal from a positioning satellite. In this connection, the positioning signal may be used to generate geographical location information of the vehicle.

The vehicle exterior information collector 302 may collect vehicle's surrounding environment information and travel status information. The vehicle exterior information collector 302 may include a radar and lidar 303 and an external camera 304.

The radar/lidar 303 may sense an object around the vehicle.

The radar/lidar 303 may sense objects ahead of, next to, and at the rear of the vehicle, and calculate distances to the sensed objects.

In addition, the radar/lidar 303 may determine whether the sensed object is a static object or a dynamic object, measure a moving speed of the sensed dynamic object, and determine whether the sensed dynamic object is a pedestrian or a vehicle.

Further, the radar/lidar 303 may be used for a purpose of identifying conditions of a traveling road and a facility through a high-resolution terrain scan.

The external camera 304 may be mounted on an exterior of the vehicle to capture images of regions ahead of, next to, and at the rear of the vehicle. To this end, the vehicle may have a plurality of external cameras.

The image captured by the external camera 304 may be used for purposes such as line distinction, identification of the object around the vehicle, augmented reality implementation, and the like.

The vehicle interior information collector 305 may collect various vehicle interior status information.

The vehicle interior information collector 305 may include an indoor camera 306 and a biometric sensor 307.

The indoor camera 306 may be mounted on one side of the interior of the vehicle to capture the driver and a passenger.

The image captured by the indoor camera 306 may be used for monitoring the driver's gaze direction and a driver's status, for example, driver distraction, tiredness, drowsy driving, and the like.

The biometric sensor 307 may be mounted on one side of the vehicle to collect various biometric information of the driver.

The biometric sensor 307 may collect the various biometric information of the driver in association with a wearable device of the driver.

For example, the biometric information may include pulse information, heart rate monitoring information, body temperature information, blood alcohol concentration information, brain wave information, fingerprint recognition information, iris recognition information, and the like, but may not be limited thereto.

The biometric information may be used for purposes of determining a driving impossible state, a drunk driving state, the drowsy driving state, and the like.

The precise map provider 308 may provide precise map information in response to a request of the autonomous driving controller 310.

The autonomous driving controller 310 may include a precise positioning device 311, a recognition device 312, a control commanding device 313, a driver status determining device 314, a user input device 315, a right to control transfer determining device 316, a lighting controller 317, and the failure safety module 318.

The precise positioning device 311 may determine a current location of the vehicle using positioning signal information received from the GPS receiver 301 and the precise map information obtained from the precise map provider 308, and map the determined current location of the vehicle on a precise map.

In addition, the precise positioning device 311 may identify status information of the traveling road of the vehicle, for example, a gradient, a road type, the number of lines, a speed limit, and the like.

The recognition device 312 may recognize a line, a vehicle around the vehicle, an obstacle, a pedestrian, and the like around the vehicle based on sensing information from the radar/lidar 303 and image information captured by the external camera 304.

The control commanding device 313 may calculate a request command value based on a recognition result of the recognition device 312, and perform travel control by transmitting the calculated request command value to a corresponding autonomous driving system.

The driver status determining device 314 may determine a driver status based on the vehicle interior status information obtained from the vehicle interior information collector 305.

In this connection, the driver status may include a distracted state, the driving impossible state, the drunk driving state, the drowsy driving state, a fatigue, and the like, but may not be limited thereto.

The user input device 315 may sense a user input based on a control signal received from the HMI 322.

In this connection, the user input may include a predetermined button input signal, a predetermined gesture input signal, and the like for accepting the right to control transfer from the system to the driver.

The driver status determining device 314 may determine whether the right to control transfer from the system to the driver is required based on at least one of various recognition information obtained from the recognition device 312, the vehicle interior status information obtained from the vehicle interior information collector 305, or driver input information obtained from the user input device 315.

When the right to control transfer is required as a result of the determination, the right to control transfer determining device 316 may transmit a predetermined control signal to the warning device 321 so that a predetermined warning message requesting the right to control transfer to the driver is output.

The lighting controller 317 may control lighting of the direction indicator 323 and the hazard flasher 324.

The failure safety module 318 may determine an optimal failure safety strategy based on a failure type sensed during the autonomous driving and a travel situation around the vehicle.

For example, the failure type may include at least one of a driver status and intention determining sensor failure, a failure of a rain sensor for weather determination, an autonomous driving controller failure, a global positioning system (GPS) receiver failure, a tire air pressure rapid decrease failure, a failure of a sensor sensing a region ahead of the vehicle, a steering-related actuator failure, a braking-related actuator failure, a driving-related actuator failure, a shift-related actuator failure, or a stability control-related actuator failure.

The failure safety module 318 may request the control commanding device 313 to perform vehicle control based on a determined failure safety strategy.

A detailed configuration and a detailed operation of the failure safety module 318 will be more apparent through a description of the drawings to be described later.

The braking system 325 may control an operation of a braking-related actuator and monitor a condition thereof.

For example, the braking system 325 may include an electric parking brake (EPB) that creates a braking force in an electronic manner rather than through a physical force of a person.

The stability control system 326 may control an operation of an actuator to stably maintain stability of a vehicle body.

As an example, the stability control system 326 may include an electronic stability control (ESC), which is an advanced electronic braking device.

The ESC is a device that controls the stability of the vehicle through cooperative control of the braking force and a traction force of the vehicle. The ESC may provide anti-lock brake system (ABS) and traction control system (TCS) functions together.

The electronic stability control (ESC) may be operated in a manner of synthesizing information measured from steering angle, lateral acceleration, yaw-rate, and wheel speed sensors to determine whether the stability of the vehicle body is stably maintained, and respectively controlling braking forces of four wheels based on such information.

The steering system 327 may control an operation of an actuator of controlling a lateral behavior of the vehicle.

For example, the steering system 327 may include a motor driven power steering (MDPS). The MDPS is a device that assists driver handling using an electronic motor rather than a hydraulic motor, which may include a redundant power input structure and multiple signal channels for stable power supply and signal transmission and reception.

The shift system 328 may control an operation of an actuator for automatic shift.

As an example, the shift system 328 may include a transmission control unit (TCU).

The transmission control unit (TCU) may control the automatic shift by determining the number of gear steps and timing based on a TPS, a vehicle speed, an engine revolution per minute, a brake switch input, and the like.

The driving system 329 may control an operation of an actuator of controlling a longitudinal behavior of the vehicle—that is, a travel speed. For example, the actuator for controlling the longitudinal behavior may include a throttle, an accelerator, and the like.

For example, the driving system 329 may include an engine management system (EMS).

The EMS may include actuators that perform electronic throttle control, gasoline direct injection, and idle stop and go functions.

The additional system 330 may include a tire pressure measurement system that senses the tire air pressure, such as a tire pressure monitoring system (TPMS), a fuel tank sensing system, a battery management system for a hybrid vehicle and an electric vehicle, and the like, but may not be limited thereto.

Figure 4:
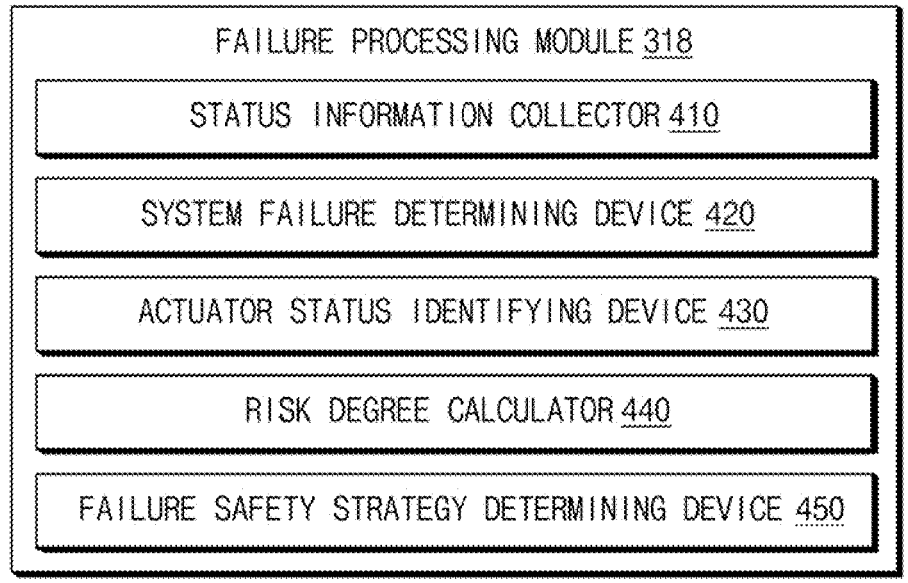
FIG. 4 is a block diagram for illustrating a detailed structure of a failure processing module disposed in a device in FIG. 3 described above.

FIG. 4 is a block diagram for illustrating a detailed structure of a failure processing module disposed in a device in FIG. 3 described above.

Referring to FIG. 4, the failure safety module 318 may include a status information collector 410, a system failure determining device 420, an actuator status identifying device 430, a risk degree calculator 440, and a failure safety strategy determining device 450.

The status information collector 410 may collect travel status information of the vehicle and vehicle surroundings status information.

In this connection, the travel status information of the vehicle may include travel speed information, travel line information, information about the number of lines of the traveling road, gradient information of the road being traveled, road surface status information, weather information, and the like, but may not be limited thereto.

The vehicle surroundings status information may include information about distances from surrounding vehicles, information about the number of surrounding vehicles, sensing information of the dynamic object other than the vehicle, static object sensing information, and the like, but may not be limited thereto.

The system failure determining device 420 may determine whether the system failure has occurred during the autonomous driving. For example, the system failure may include an actuator failure, an in-vehicle communication failure, and the like, but may not be limited thereto and may include a tire air pressure abnormality or the like.

When a normal operation is not performed in response to a control request command transmitted by the autonomous driving controller 310 to a specific system, the system failure determining device 420 may determine that the corresponding system has failed.

In addition, when a signal scheduled to be received from a system is not received for a certain time, the system failure determining device 420 may determine that the autonomous travel controller 310 has failed to communicate with the corresponding system.

The system failure determining device 420 may identify the failure type and calculate the number of failed systems, controllers, and actuators.

The actuator status identifying device 430 may collect controller status information and/or actuator status information from the controller of each system to identify a controllable actuator status.

The risk degree calculator 440 may calculate a risk degree of the vehicle based on the failure type, the number of failures, the vehicle travel status information, and the like.

As an example, the risk degree calculator 440 may calculate an initial risk degree r1 corresponding to the failure type as shown in Mathematical equation 1 below and assign a weight value to the initial risk degree based on the number of failures and the vehicle travel status information to calculate a final risk degree r2.

$$r2 = r1 \times w1 \times w2 \qquad \text{<Mathematical equation 1>}$$

In this connection, w1 is a weight value based on the number of failures, and w2 is a weight based on the vehicle travel status information.

In an embodiment, risk degrees for each failure type may be divided into 3 levels of a low risk, a medium risk, and a high risk, but may not be limited thereto, and more subdivided risk degrees may be defined based on a design of a person skilled in the art.

The low risk may correspond to a case in which the vehicle behavior is not directly affected and a system failure that affects identifying a state of the system or a driver's intention has occurred.

The medium risk may correspond to a case in which the vehicle behavior is indirectly affected or a system failure that results in system performance deterioration has occurred.

The high risk may correspond to a case in which lateral/longitudinal control of the vehicle is directly affected or a system that senses the vehicle, the obstacle, and the like located ahead of the vehicle is failed.

As an example, the risk degree calculator 440 may determine that, even when a failure of the same type occurs, a state in which multiple surrounding vehicles are sensed around the vehicle has a higher risk degree than a state in which there is no vehicle around the vehicle.

The failure safety strategy determining device 450 may determine a safety state based on the risk degree determined by the risk degree calculator 440 and normally controllable actuator information identified by the actuator status identifying device 430, and determine the optimal failure safety strategy for entering the determined safety state.

In addition, the failure safety strategy determining device 450 may determine a maximum allowable time until entering the safety state based on the normally controllable actuator information.

In general, the higher the risk degree, the shorter the maximum allowable time until entering the safety state may be determined.

However, when the braking system has failed, despite a very high risk degree, the maximum allowable time may be dynamically changed based on the vehicle speed and the gradient.

In some implementations, even in a case of failures of the same risk degree, different failure safety strategies may be applied based on the failure type.

For example, a MDPS failure and an ESC failure may be evaluated of having the same risk degree.

In the case of the MDPS failure, the failure safety strategy determining device 450 may determine a failure safety strategy for performing emergency stop, gear step shift (N and P), EPB fastening, and the like for a purpose of rapid termination of the autonomous driving system.

In the case of ECS failure, the failure safety strategy determining device 450 may determine a failure safety strategy for performing the EPB fastening after dropping the vehicle speed to a speed equal to or below a certain speed through the gear step shifting (N) and the lateral control.

In some implementations, the failure type identified by the system failure determining device 420 may include the failure of the sensor for determining the driver status and intention, for example, the indoor camera 306 and the biometric sensor 307, the failure of the rain sensor for the weather determination, the failure of the autonomous driving controller 310, the failure of the GPS receiver 301, the tire air pressure rapid decrease failure, a braking system failure, the failure of the sensor sensing the region ahead of the vehicle, a steering system failure, an acceleration/deceleration system failure, and the like, but may not be limited thereto.

In some implementations, an actuator that is identified of whether being able to be normally controlled by the actuator status identifying device 430 may include the MDPS, the ESC, the EPB, the TCU, and the EMS.

In some implementations, the risk degree calculator 440 may identify surrounding situation information, determine whether an operable actuator is an important factor for a failsafe action, and determine whether the region ahead of the vehicle is able to be sensed through the sensor sensing the region ahead of the vehicle to determine a final risk degree.

An example of a failsafe action for each risk degree will be as follows.

Example of Low Risk Failsafe Action sensing the failure of the driver status/intention determination sensor→identifying that all controllable actuators are in a normal condition→determining severity by identifying, by a risk degree determining device, the surrounding situation and the actuator status→alerting the driver to recognize of being in a failure situation through a warning while performing deceleration control with a small deceleration amount or constant speed control.

sensing the failure of the rain sensor identifying that all the controllable actuators are in the normal condition-→determining the severity by identifying, by the risk degree determining device, the surrounding situation and the actuator status→alerting the driver to recognize of being in the failure situation through the warning while performing the deceleration control with the small deceleration amount or the constant speed control.

Figure 5:
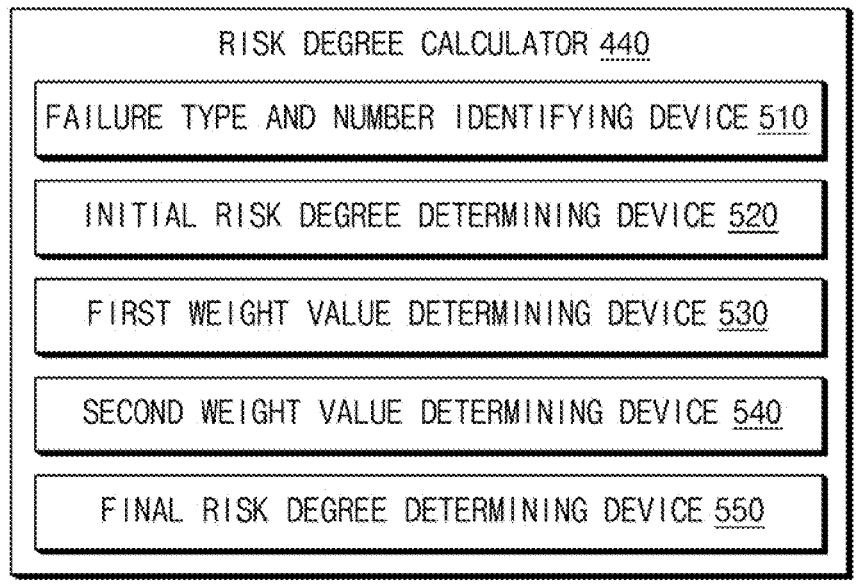
FIG. 5 is a block diagram for illustrating a structure of a risk degree calculator according to one form of the present disclosure.

Example of Medium Risk Failsafe Action the failure of the rain sensor→identifying that all the controllable actuators are in the normal condition→determining the severity by identifying, by the risk degree determining device, the surrounding situation and the actuator status→a collision is expected because the vehicle behavior is unstable (a large slip occurs) and there are many surrounding vehicles→performing control with a large deceleration amount Example of High Risk Failsafe Action it is impossible to identify a status of the region ahead of the vehicle because of failures of all the sensors for sensing the region ahead of the vehicle→identifying that all the controllable actuators are in the normal condition→determining, by the risk degree determining device, the risk degree to the highest level because the sensing of the region ahead of the vehicle is impossible→performing the deceleration control with the maximum deceleration amount to terminate an autonomous driving mode as quickly as possible and induce the vehicle to be safely stopped FIG. 5 is a block diagram for illustrating a structure of a risk degree calculator according to one form of the present disclosure.

Referring to FIG. 5, the risk degree calculator 440 may include a failure type and number identifying device 510, an initial risk degree determining device 520, a first weight value determining device 530, a second weight value determining device 540, and a final risk degree determining device 550.

The failure type and number identifying device 510 may identify the types and the number of failures occurred when autonomous driving failures occur.

In this connection, the number of failures may be calculated for the autonomous driving control system and/or the actuator and/or the sensor.

The initial risk degree determining device 520 may calculate the initial risk degree based on the failure type.

The first weight value determining device 530 may determine a first weight value based on the number of failures.

The second weight value determining device 540 may determine a second weight value based on the vehicle travel status information.

The final risk degree determining device 550 may determine the final risk degree by applying the first to the second weight values to the initial risk degree.

Figure 6:
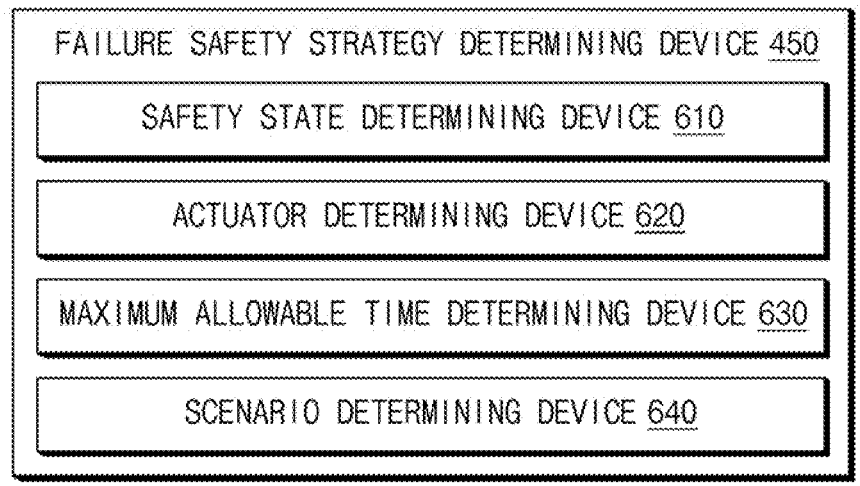
FIG. 6 is a block diagram for illustrating a structure of a failure safety strategy determining device according to one form of the present disclosure.

FIG. 6 is a block diagram for illustrating a structure of a failure safety strategy determining device according to one form of the present disclosure.

Referring to FIG. 6, the failure safety strategy determining device 450 may include a safety state determining device 610, an actuator determining device 620, a maximum allowable time determining device 630, and a scenario determining device 640.

The safety state determining device 610 may determine the safety state based on the normally controlled controllable actuator information and the determined risk degree.

The actuator determining device 620 may determine an actuator to be used to correspond to the determined safety state among the normally controllable actuators.

The maximum allowable time determining device 630 may determine a maximum allowable time corresponding to the corresponding safety state based on the actuator determined to be used and the risk degree.

The scenario determining device 640 may determine an optimal failure safety scenario controllable through the actuator determined to be used in correspondence with the current safety state.

The control commanding device 313 may control the vehicle based on the determined failure safety scenario to safely induce the vehicle to stop.

Figure 7:
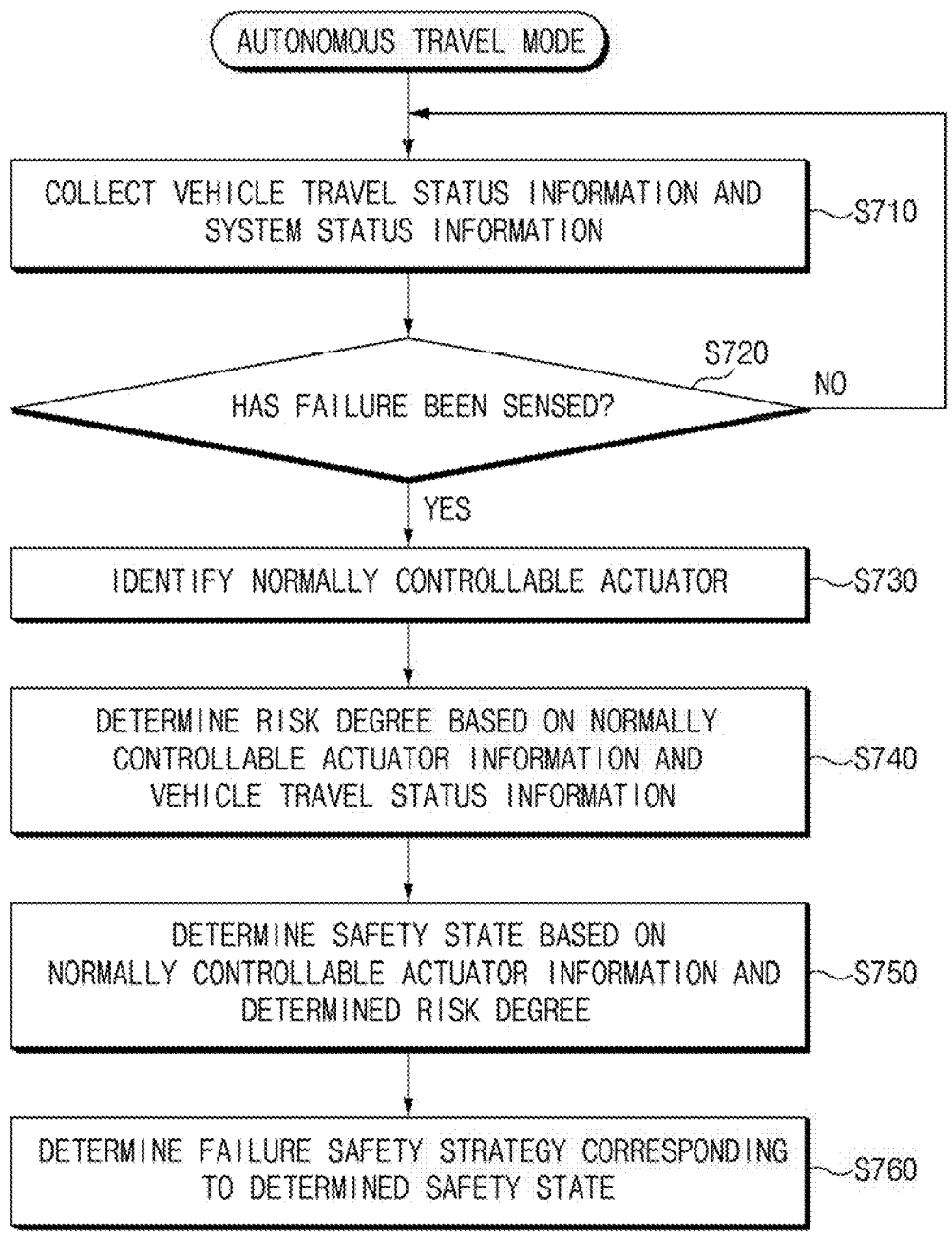
FIG. 7 is a flowchart for illustrating an autonomous driving control method in a failure safety module according to one form of the present disclosure.

FIG. 7 is a flowchart for illustrating an autonomous driving control method in a failure safety module according to one form of the present disclosure.

Referring to FIG. 7, the failure safety module 318 may collect the vehicle travel status information and system status information in the autonomous driving mode (S710).

For example, the system status information may include at least one of braking system information, stability control system information, steering system information, shift system information, driving system information, camera system information, tire pressure measurement system information, fuel tank sensing system information, battery management system information, rain sensing system information, system information of the sensor for sensing the region ahead of the vehicle, or autonomous driving controller status information.

The failure safety module 318 may determine whether the system failure has occurred based on the vehicle travel status information and the system status information (S720).

When the system failure has sensed as a result of the determination, the failure safety module 318 may identify the normally controllable actuator (S730).

The failure safety module 318 may determine the risk degree corresponding to the sensed failure based on the normally controllable actuator information and the vehicle travel status information (S740).

The failure safety module 318 may determine the safety state based on the normally controllable actuator information and the determined risk degree (S750).

The failure safety module 318 may determine the optimal failure safety strategy corresponding to the determined safety state (S760).

The control commanding device 313 of the autonomous driving controller 310 may safely induce the vehicle to stop by performing actuator operation control and deceleration control differentiated based on the determined failure safety strategy.

Figure 8:
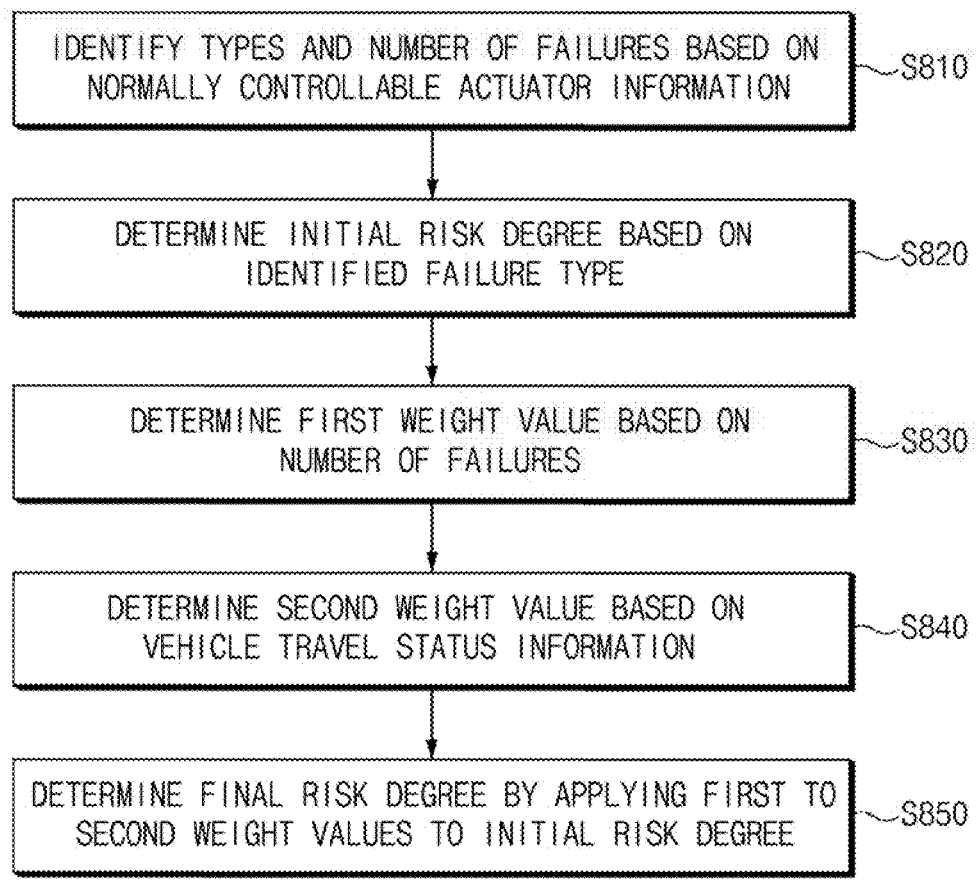
FIG. 8 is a flowchart for illustrating an autonomous driving control method in a risk degree calculator according to one form of the present disclosure.

FIG. 8 is a flowchart for illustrating an autonomous driving control method in a risk degree calculator according to one form of the present disclosure.

Referring to FIG. 8, the risk degree calculator 440 may identify the types and the number of failures occurred when the autonomous driving failures occur (S810).

In this connection, the number of failures may be calculated for the autonomous driving control system and/or the actuator and/or the sensor.

The risk degree calculator 440 may calculate the initial risk degree based on the failure type (S820).

The risk degree calculator 440 may determine the first weight value based on the number of failures (S830).

The risk degree calculator 440 may determine the second weight value based on the vehicle travel status information (S840).

The risk degree calculator 440 may determine the final risk degree by applying the first to the second weight values to the initial risk degree (S850).

Figure 9:
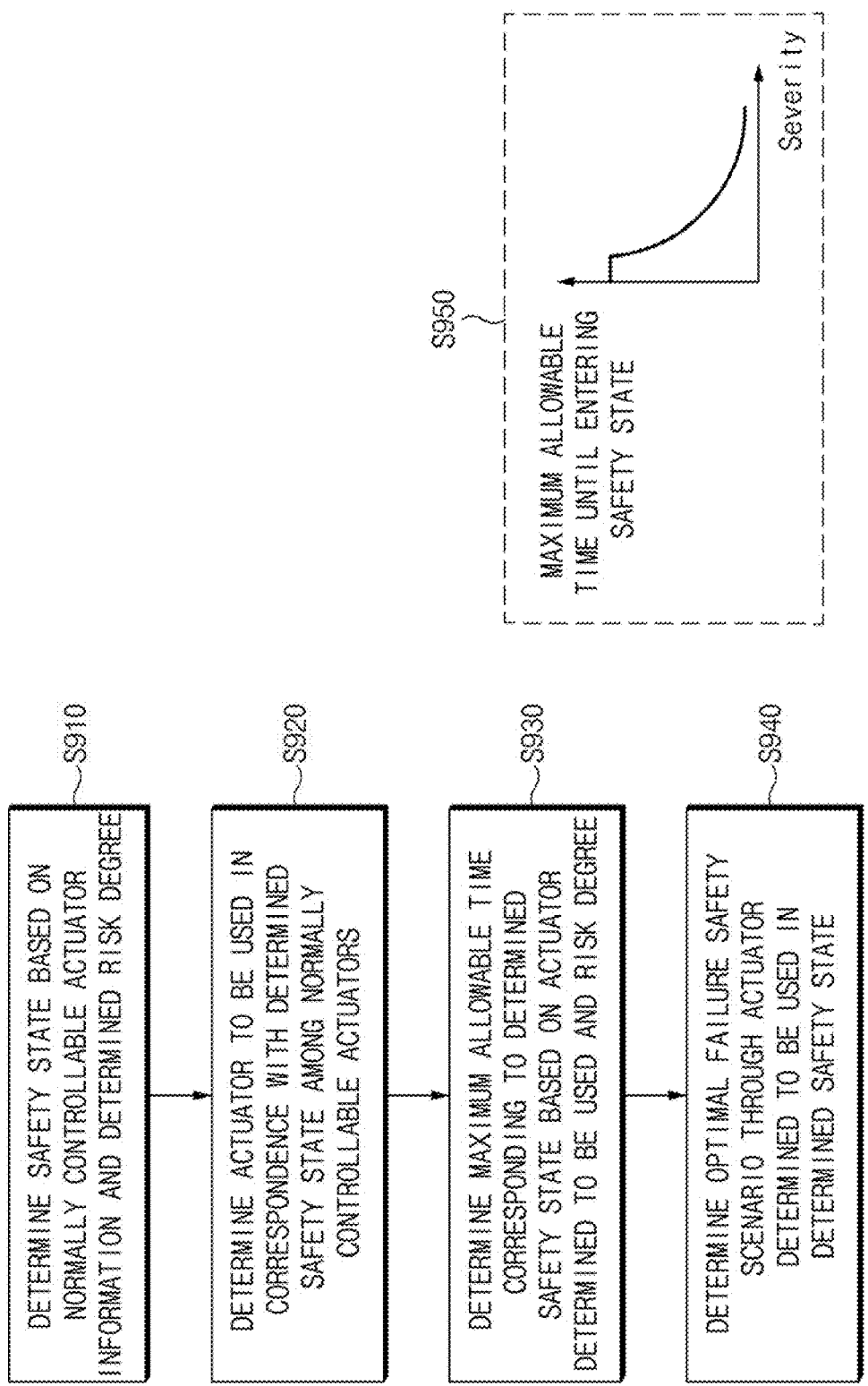
FIG. 9 is a flowchart for illustrating an autonomous driving control method in a failure safety strategy determining device according to one form of the present disclosure.

FIG. 9 is a flowchart for illustrating an autonomous driving control method in a failure safety strategy determining device according to one form of the present disclosure.

The failure safety strategy determining device 450 may determine the safety state based on the normally controllable actuator information and the risk degree (S910).

The failure safety strategy determining device 450 may determine the actuator to be used in correspondence with the determined safety state among the normally controllable actuators (S920).

The failure safety strategy determining device 450 may determine the maximum allowable time corresponding to the corresponding safety state based on the actuator determined to be used and the risk degree (S930).

The failure safety strategy determining device 450 may determine the optimal failure safety scenario corresponding to the safety state determined through the actuator determined to be used (S940).

In an embodiment, referring to a reference numeral 950, the maximum allowable time corresponding to the safety state may become shorter as the risk degree (the severity) increases, that is, may be inversely proportional to the risk degree. However, this is merely an example, and the maximum allowable time may be determined by further considering the failure type, the normally controllable actuator information, and the like.

Hereinafter, an exemplary failure safety strategy for each of various failure situations will be described with reference to FIGS. 3 to 6.

Figure 10:
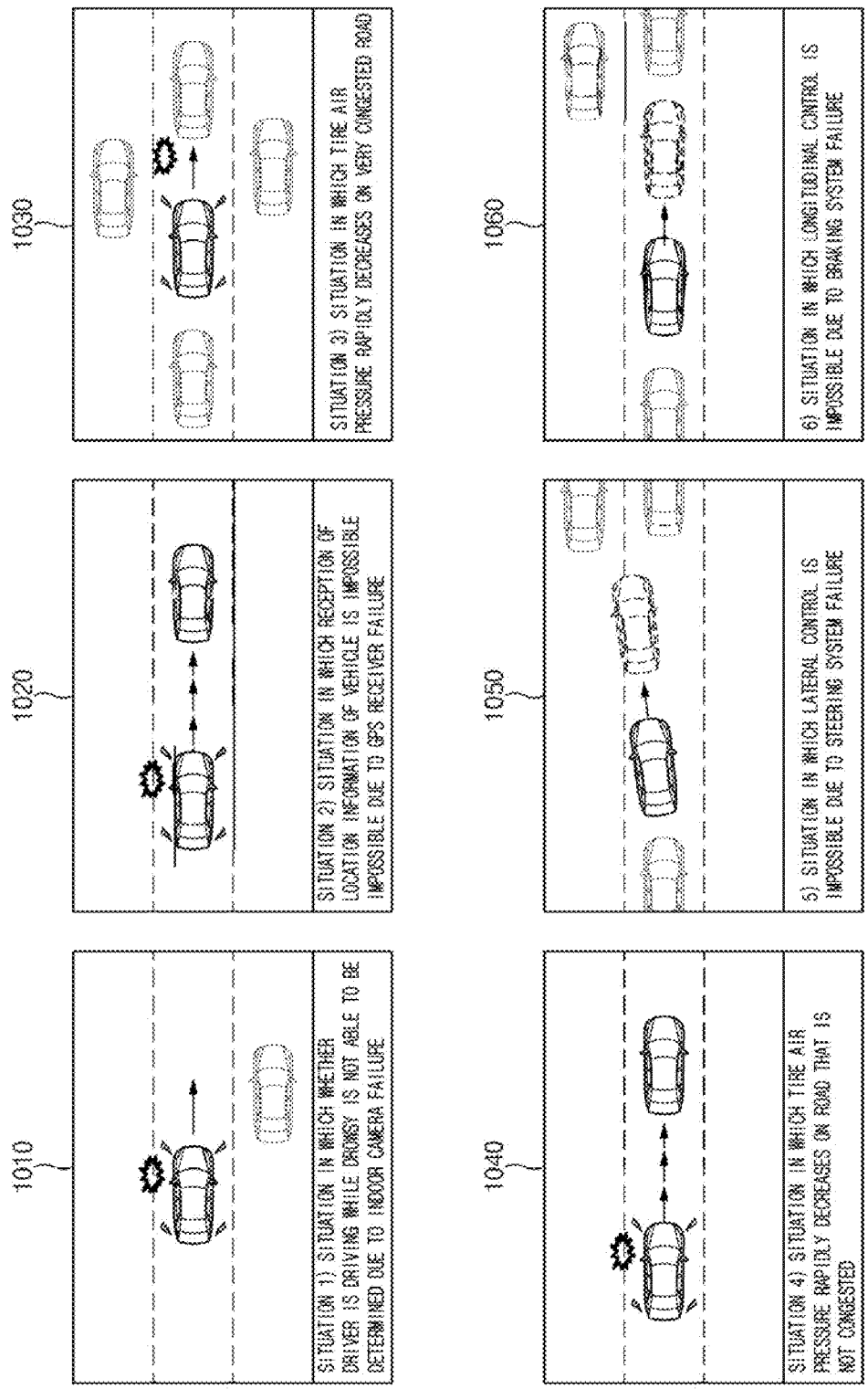
FIG. 10 is a view for illustrating a failure safety strategy for each failure situation according to one form of the present disclosure.

FIG. 10 is a view for illustrating a failure safety strategy for each failure situation according to an embodiment.

A reference numeral 1010 is a view for illustrating an exemplary failure safety strategy in a situation (a situation 1) in which whether the driver is driving while drowsy is not able to be determined due to an indoor camera failure.

Referring to the reference numeral 1010, the system failure determining device 420 may receive a predetermined warning signal transmitted from a controller of the indoor camera 306 to identify indoor camera failure information.

The actuator status identifying device 430 may determine whether the actuators, such as the MDPS/the ESC/the EPB/the TCU/the EMS, are operating normally to determine all the actuators are in a state of being capable of operating normally.

The risk degree calculator 440 may calculate the risk degree based on the failure type, the number of failures, and the vehicle travel status information—that is, the vehicle surrounding situation and the travel situation information.

As an example, the risk degree calculator 440 may determine, for the situation 1, a risk degree (a severity) of a current failure=0.5 (low), a weight value based on a plurality of failures=1 (none), and a weight value based on the surrounding/travel situation=0.7 (normal) to determine the final risk degree as 0.35 (0.5*1*0.7) (very low).

When the final risk degree is very low and all control operations are possible through the normally controllable actuators, the failure safety strategy determining device 450 may identify the line through analysis of an image captured by a front camera to perform actuator control as shown in Table 1 below.

TABLE 1

| MDPS | TCU | EMS | ESC | EPB |
|---|---|---|---|---|
| Maintain control (maintain line) | Maintain control | Maintain control | Perform low-deceleration control | Non-fastening control |

A reference numeral 1020 is a view for illustrating an exemplary failure safety strategy in a situation (a situation 2) in which reception of the location information of the vehicle is impossible due to a GPS receiver failure.

Referring to the reference numeral 1020, the system failure determining device 420 may receive a predetermined control signal informing the failure of the GPS receiver 301 from the precise positioning device 311.

The actuator status identifying device 430 may determine whether the actuators, such as the MDPS/the ESC/the EPB/the TCU/the EMS, are operating normally to determine all the actuators are in the state of being capable of operating normally.

The risk degree calculator 440 may calculate the risk degree based on the failure type, the number of failures, and the vehicle travel status information—that is, the vehicle surrounding situation and the travel situation information.

As an example, the risk degree calculator 440 may determine, for the situation 2, a risk degree (a severity) of a current failure=1.0 (normal), a weight value based on a plurality of failures=1 (none), and a weight value based on the surrounding/travel situation=0.5 (low) to determine the final risk degree as 0.5 (1*1*0.5) (low).

When the final risk degree is low and all control operations are possible through the normally controllable actuators, the failure safety strategy determining device 450 may identify the line through the analysis of the image captured by the front camera to perform actuator control as shown in Table 2 below.

TABLE 2

| MDPS | TCU | EMS | ESC | EPB |
|---|---|---|---|---|
| Maintain control (maintain line) | Maintain control | Maintain control | Perform low-deceleration control | Non-fastening control |

A reference numeral 1030 is a view for illustrating an exemplary failure safety strategy in a situation (a situation 3) in which the tire air pressure rapidly decreases on a very congested road.

Referring to the reference numeral 1030, the system failure determining device 420 may receive tire air pressure sensing information from the TPMS to identify the rapid decrease in the tire air pressure.

The actuator status identifying device 430 may determine whether the actuators, such as the MDPS/the ESC/the EPB/the TCU/the EMS, are operating normally to determine all the actuators are in the state of being capable of operating normally.

The risk degree calculator 440 may calculate the risk degree based on the failure type, the number of failures, and the vehicle travel status information—that is, the vehicle surrounding situation and the travel situation information.

As an example, the risk degree calculator 440 may determine, for the situation 3, a risk degree (a severity) of a current failure=1 (normal), a weight value based on a plurality of failures=1 (none), and a weight value based on the surrounding/travel situation=1.5 (high) to determine the final risk degree as 1.5 (1*1*1.5) (high).

When the final risk degree is high and all control operations are possible through the normally controllable actuators, the failure safety strategy determining device 450 may perform actuator control as shown in Table 3 below.

TABLE 3

| MDPS | TCU | EMS | ESC | EPB |
|---|---|---|---|---|
| Maintain control (maintain line) | Maintain control | Maintain control | Perform rapid-deceleration control | Non-fastening control |

A reference numeral 1040 is a view for illustrating an exemplary failure safety strategy in a situation (a situation 4) in which the tire air pressure rapidly decreases on a road that is not congested.

Referring to the reference numeral 1040, the system failure determining device 420 may receive the tire air pressure sensing information from the TPMS to identify the rapid decrease in the tire air pressure.

The actuator status identifying device 430 may determine whether the actuators, such as the MDPS/the ESC/the EPB/the TCU/the EMS, are operating normally to determine all the actuators are in the state of being capable of operating normally.

The risk degree calculator 440 may calculate the risk degree based on the failure type, the number of failures, and the vehicle travel status information—that is, the vehicle surrounding situation and the travel situation information.

As an example, the risk degree calculator 440 may determine, for the situation 4, a risk degree (a severity) of a current failure=1.0 (normal), a weight value based on a plurality of failures=1 (none), and a weight value based on the surrounding/travel situation=0.5 (low) to determine the final risk degree as 0.5 (1*1*0.5) (low).

When the final risk degree is low and all control operations are possible through the normally controllable actuators, the failure safety strategy determining device 450 may perform actuator control as shown in Table 4 below.

TABLE 4

| MDPS | TCU | EMS | ESC | EPB |
| --- | --- | --- | --- | --- |
| Maintain control (maintain line) | Maintain control | Maintain control | Perform low-deceleration control | Non-fastening control |

A reference numeral 1050 is a view for illustrating an exemplary failure safety strategy in a situation (a situation 5) in which lateral control is impossible due to a MDPS failure.

Referring to the reference numeral 1050, the system failure determining device 420 may receive MDPS actuator failure information from the steering system 327.

The actuator status identifying device 430 may determine whether the actuators, such as the MDPS/the ESC/the EPB/the TCU/the EMS, are operating normally to determine all the actuators are in the state of being capable of operating normally.

The risk degree calculator 440 may calculate the risk degree based on the failure type, the number of failures, and the vehicle travel status information—that is, the vehicle surrounding situation and the travel situation information.

As an example, the risk degree calculator 440 may determine, for the situation 5, a risk degree (a severity) of a current failure=2.0 (high), a weight value based on a plurality of failures=1 (none), and a weight value based on the surrounding/travel situation=2.0 (very high) to determine the final risk degree as 4.0 (2.0*1*2.0) (very high).

When the final risk degree is very high and normal control through the MDPS actuator is impossible, the failure safety strategy determining device 450 may perform actuator control as shown in Table 5 below.

TABLE 5

| MDPS | TCU | EMS | ESC | EPB |
| --- | --- | --- | --- | --- |
| Impossible to control | Maintain control | Maintain control | Perform maximum-deceleration control | Non-fastening control |

A reference numeral 1060 is a view for illustrating an exemplary failure safety strategy in a situation (a situation 6) in which longitudinal control is impossible due to a braking system failure.

Referring to the reference numeral 1060, the system failure determining device 420 may receive ESC actuator failure information from the braking system 325.

The actuator status identifying device 430 may determine whether the actuators, such as the MDPS/the ESC/the EPB/the TCU/the EMS, are operating normally to determine all the actuators are in the state of being capable of operating normally.

The risk degree calculator 440 may calculate the risk degree based on the failure type, the number of failures, and the vehicle travel status information—that is, the vehicle surrounding situation and the travel situation information.

As an example, the risk degree calculator 440 may determine, for the situation 6, a risk degree (a severity) of a current failure=3.0 (very high), a weight value based on a plurality of failures=1 (none), and a weight value based on the surrounding/travel situation=1.0 (normal) to determine the final risk degree as 3.0 (3.0*1*1.0) (very high).

When the final risk degree is very high and normal control through the ECS actuator is impossible, the failure safety strategy determining device 450 may perform actuator control as shown in Table 6 below.

TABLE 6

| MDPS | TCU | EMS | ESC | EPB |
| --- | --- | --- | --- | --- |
| Control to maintain control | N stage shift control | Output limiting control | Impossible to control | Fastening control |

The operations of the method or the algorithm described in connection with the examples disclosed herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium is coupled to the processor, which may read information from, and write information to, the storage medium. In another method, the storage medium may be integral with the processor. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the various forms disclosed in the present disclosure are not intended to limit the technical idea of the present disclosure but to illustrate the present disclosure, and the scope of the technical idea of the present disclosure is not limited by the forms. The scope of the present disclosure should be construed as being covered by the scope of the appended claims, and all technical ideas falling within the scope of the claims should be construed as being included in the scope of the present disclosure.

The present disclosure has an advantage of providing the device and the method for controlling the autonomous driving.

In addition, the present disclosure has an advantage of providing the method and the device for controlling the autonomous driving capable of dynamically providing the failure safety strategy based on the sensed failure type and travel situation around the vehicle during the autonomous driving.

In addition, the present disclosure has an advantage of providing the method and the device for controlling the autonomous driving capable of enabling the safe stop induction and the safe right to control transfer to the driver by differentiating the failure safety strategy based on the failure type and the risk degree when the system failure is sensed during the autonomous driving.

In addition, the present disclosure has an advantage of providing the method and the device for controlling the autonomous driving capable of increasing travel safety through a control strategy differentiated for each failure type and minimizing a sense of difference of the driver.

In addition, various effects that may be directly or indirectly identified through the present document may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling autonomous driving in a vehicle capable of the autonomous driving, the method comprising:
   collecting vehicle travel status information and system status information during the autonomous driving;
   sensing a failure based on the system status information;
   identifying normally controllable actuators which are operating normally when sensing the failure;
   determining a risk degree corresponding to the sensed failure based on a normally controllable actuator information and the vehicle travel status information;
   determining a safety state based on the normally controllable actuator information and the risk degree; and
   determining a failure safety strategy corresponding to the safety state,
   wherein determining the risk degree comprises:
      identifying a number of failed actuators;
      determining a first weight value based on the number of failed actuators; and
      determining a final risk degree by applying the first weight value to an initial risk degree.

2. The method of claim 1, wherein determining the risk degree further includes:
   identifying a failure type based on the normally controllable actuator information;
   determining the initial risk degree based on the failure type;
   determining a second weight value based on the vehicle travel status information; and
   determining the final risk degree by applying the second weight value to the initial risk degree.

3. The method of claim 2, wherein the failure type includes at least one of a driver status and intention determining sensor failure, a failure of a rain sensor for weather determination, an autonomous driving controller failure, a global positioning system (GPS) receiver failure, a tire air pressure rapid decrease failure, a failure of a sensor for sensing a region ahead of the vehicle, a steering-related actuator failure, a braking-related actuator failure, a driving-related actuator failure, a shift-related actuator failure, or a stability control-related actuator failure.

4. The method of claim 2, wherein determining the failure safety strategy corresponding to the safety state includes:
   determining an actuator to be used corresponding to the determined safety state among the identified normally controllable actuators;
   determining a maximum allowable time corresponding to the determined safety state based on the actuator determined to be used and the final risk degree; and
   determining an optimal failure safety scenario through the actuator determined to be used in the determined safety state.

5. The method of claim 4, wherein the maximum allowable time is determined in inverse proportion to the final risk degree.

6. The method of claim 1, wherein the vehicle travel status information includes at least one of positioning signal information, vehicle exterior information, vehicle interior information, or precise map information,
   wherein the vehicle exterior information includes at least one of radar sensing information, lidar sensing information, or external camera capture information, and
   wherein the vehicle interior information includes at least one of indoor camera capture information or driver bio-sensing information.

7. The method of claim 6, wherein the method further comprises:
   determining a driver status based on the vehicle interior information,
   wherein the risk degree is determined further based on the driver status determination.

8. The method of claim 1, wherein the system status information includes at least one of braking system information, stability control system information, steering system information, shift system information, driving system information, camera system information, tire pressure measurement system information, fuel tank sensing system information, battery management system information, rain sensing system information, system information of a sensor for sensing a region ahead of the vehicle, or autonomous driving controller status information.

9. The method of claim 1, wherein the actuator includes at least one of an electric parking brake (EPB), an electronic stability control (ESC), a motor driven power steering (MDPS), a transmission control unit (TCU), or an engine management system (EMS).

10. The method of claim 1, wherein as the risk degree is higher, the failure safety strategy is determined for performing deceleration control with a large deceleration amount.

11. A device for controlling autonomous driving for an autonomous vehicle, the device comprising:
    a status information collector configured to collect vehicle travel status information and system status information during autonomous driving;
    a system failure determining device configured to sense a failure based on the system status information;
    an actuator status identifying device configured to identify normally controllable actuators which are operating normally when sensing the failure;
    a risk degree calculator configured to determine a risk degree corresponding to the sensed failure based on a normally controllable actuator information and the vehicle travel status information; and
    a failure safety strategy determining device configured to determine a safety state based on the normally controllable actuator information and the risk degree and to determine a failure safety strategy corresponding to the safety state,
    wherein the risk degree calculator includes:
       a failure type and number identifying device configured to identify a number of failed actuators;
       a first weight value determining device configured to determine a first weight value based on the number of failed actuators; and
       a final risk degree determining device configured to determine a final risk degree by applying the first weight value to an initial risk degree.

12. The device of claim 11, wherein the risk degree calculator includes:
    an initial risk degree determining device configured to determine the initial risk degree based on the failure type; and
    a second weight value determining device configured to determine a second weight value based on the vehicle travel status information, wherein the failure type and number identifying device is configured to identify a failure type and the number of failed actuators based on the normally controllable actuator information, and the final risk degree determining device is configured to determine the final risk degree by applying the second weight value to the initial risk degree.

13. The device of claim 12, wherein the failure type includes at least one of a driver status and intention determining sensor failure, a failure of a rain sensor for weather determination, an autonomous driving controller failure, a global positioning system (GPS) receiver failure, a tire air pressure rapid decrease failure, a failure of a sensor for sensing a region ahead of the vehicle, a steering-related actuator failure, a braking-related actuator failure, a driving-related actuator failure, a shift-related actuator failure, or a stability control-related actuator failure.

14. The device of claim 12, wherein the failure safety strategy determining device includes:
   an actuator determining device configured to determine an actuator to be used corresponding to the determined safety state among the identified normally controllable actuators;
   a maximum allowable time determining device configured to determine a maximum allowable time corresponding to the determined safety state based on the actuator determined to be used and the final risk degree; and
   a scenario determining device configured to determine an optimal failure safety scenario through the actuator determined to be used in the determined safety state.

15. The device of claim 14, wherein the maximum allowable time is determined in inverse proportion to the final risk degree.

16. The device of claim 11, wherein the vehicle travel status information includes at least one of positioning signal information, vehicle exterior information, vehicle interior information, or precise map information,
   wherein the vehicle exterior information includes at least one of radar sensing information, lidar sensing information, or external camera capture information, and
   wherein the vehicle interior information includes at least one of indoor camera capture information or driver bio-sensing information.

17. The device of claim 16, the device further comprising:
   a driver status determining device configured to determine a driver status based on the vehicle interior information,
   wherein the risk degree calculator determines the risk degree further based on the driver status determination.

18. The device of claim 11, wherein the system status information includes at least one of braking system information, stability control system information, steering system information, shift system information, driving system information, camera system information, tire pressure measurement system information, fuel tank sensing system information, battery management system information, rain sensing system information, system information of a sensor for sensing a region ahead of the vehicle, or autonomous driving controller status information.

19. The device of claim 11, wherein the actuator includes at least one of an electric parking brake (EPB), an electronic stability control (ESC), a motor driven power steering (MDPS), a transmission control unit (TCU), or an engine management system (EMS).

20. The device of claim 11, wherein as the risk degree is higher, the failure safety strategy determining device determines the failure safety strategy for performing deceleration control with a large deceleration amount.

* * * * *